(12) United States Patent
Sato

(10) Patent No.: US 8,494,292 B2
(45) Date of Patent: Jul. 23, 2013

(54) IMAGE PROCESSING APPARATUS

(75) Inventor: Yousuke Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1081 days.

(21) Appl. No.: 12/017,922

(22) Filed: Jan. 22, 2008

(65) Prior Publication Data

US 2008/0175499 A1    Jul. 24, 2008

(30) Foreign Application Priority Data

Jan. 24, 2007   (JP) ................................. 2007-014198

(51) Int. Cl.
*G06K 9/36* (2006.01)
*H04N 7/01* (2006.01)

(52) U.S. Cl.
USPC . 382/236; 382/238; 375/240.14; 375/240.16; 348/452; 348/701

(58) Field of Classification Search
USPC ................ 382/236, 238; 375/240.12, 240.14, 375/240.16; 348/448, 441, 451, 452, 701, 348/700
See application file for complete search history.

(56) References Cited

U.S. PATENT DOCUMENTS

| | | | | |
|---|---|---|---|---|
| 4,307,420 A * | 12/1981 | Ninomiya et al. | ....... | 375/240.14 |
| 5,579,058 A * | 11/1996 | Lee | ................. | 348/699 |
| 5,774,677 A * | 6/1998 | Wickstrom | .................... | 709/247 |
| 7,095,445 B2 * | 8/2006 | Kim et al. | ...................... | 348/448 |
| 7,265,791 B2 * | 9/2007 | Song et al. | ..................... | 348/448 |
| 7,502,071 B2 * | 3/2009 | Matsuzaki et al. | ............ | 348/452 |
| 7,961,254 B2 * | 6/2011 | Matsuoka | ...................... | 348/454 |
| 7,961,961 B2 * | 6/2011 | Hizume et al. | ................. | 382/236 |
| 7,990,471 B1 * | 8/2011 | Otobe et al. | .................. | 348/448 |
| 2004/0125231 A1 * | 7/2004 | Song et al. | ..................... | 348/452 |
| 2004/0212732 A1 * | 10/2004 | Matsuzaki et al. | ............ | 348/452 |
| 2006/0152620 A1 * | 7/2006 | Morita | .......................... | 348/448 |
| 2007/0103589 A1 * | 5/2007 | Tanaka | .......................... | 348/448 |

FOREIGN PATENT DOCUMENTS

| | | |
|---|---|---|
| JP | 01-314493 A | 12/1989 |
| JP | 06-311485 A | 11/1994 |
| JP | 3062286 B | 7/2000 |
| JP | 2000-348183 A | 12/2000 |
| JP | 2002-185933 | 6/2002 |
| JP | 2003-244660 A | 8/2003 |
| JP | 2006-041619 | 2/2006 |

OTHER PUBLICATIONS

The above references were cited in a Dec. 16, 2011 Japanese Office Action, which is enclosed without an English Translation, that issued in Japanese Patent Application No. 2007-014198.

* cited by examiner

*Primary Examiner* — Jon Chang

(74) *Attorney, Agent, or Firm* — Cowan, Liebowitz & Latman, P.C.

(57) ABSTRACT

An apparatus calculates a change predicted value of a value of an interest pixel included in an interest field. The apparatus calculates a change predicted value before correcting the value of the interest pixel based on the interest field and at least one of fields which neighbors the interest field and is stored in the plurality of field memories, respectively calculates interframe difference coefficients based on any of two fields having a field interval of 2 of a plurality of fields stored in the plurality of field memories, and a field which is being input, calculates a correction value of the change predicted value based on the interframe difference coefficients calculated, and corrects the change predicted value before correction calculated by the change predicted value calculator based on the correction value calculated by the correction value calculation unit and output a change predicted value after correction.

8 Claims, 10 Drawing Sheets

IMAGE PROCESSING APPARATUS

BACKGROUND OF THE INVENTION

1. Field of the Invention

The present invention relates to a technique for generating a progressive video signal from an interlaced video signal and, in particular an image processing apparatus.

2. Description of the Related Art

As existing color television signal schemes, an NTSC (National Television System Committee) scheme, PAL (Phase Alternation by Line) scheme, and the like are known. These signal schemes are characterized by interlaced scan (a video signal based on such signal scheme is called an interlaced video signal).

Interlaced scan is also called interlace scan, and is a scheme for scanning by interlacing scan lines one by one. In case of an NTSC signal, since one image is expressed by 525 scan lines, it is decomposed into 262.5 lines for interlaced scan. Due to the presence of a fraction of 0.5 below the decimal point, when one scan is complete and another scan starts, the return position deviates by 0.5. As a result, picture elements which undergo the first scan and those which undergo the second scan deviate in position, and these picture elements are combined to display an image defined by 525 lines. At this time, an image defined by 262.5 scan lines is called a field, and an image defined by 525 lines which are transmitted by two vertical scans is called a frame. In this way, respective fields define images which alternately deviate from each other. In general, an even-numbered field is called an even field, and an odd-numbered field is called an odd field.

On the other hand, as a scan method which is different from interlaced scan schemes such as NTSC, PAL, and the like generally used in the color television signal schemes, progressive scan is known. A video signal in such signal scheme is called a progressive video signal. Progressive scan is also called sequential scan, and sequentially scans and displays an image. For example, image display panels such as a PDP (Plasma Display Panel), LCD (Liquid Crystal Display), LED (Light Emitting Diode), and the like make progressive scan.

In order to display a color television signal on the PDP, LCD, LED, or the like, processing for converting an interlaced scan signal into a progressive scan signal is required. This processing is generally called IP conversion (Interlaced to Progressive conversion) processing.

Various IP conversion processing schemes are known. In particular, recently, a motion adaptive IP conversion schemes which detects a motion of an image based on differences of pixel data between fields and adaptively generates line data in accordance with a moving image or still image is popularly used to attain high image quality.

This scheme performs intrafield interpolation for a moving image, and interfield interpolation for a still image. More specifically, image data suited to a moving image is generated by interpolating an image in a field for which line data are to be generated, and image data suited to a still image is generated by interpolating images between two fields including a field for which line data are to be generated. The generated image data suited to a moving image will be referred to as moving image interpolation data hereinafter, and the image data suited to a still image will be referred to as still image interpolation data hereinafter. In the motion adaptive IP conversion scheme, the moving image interpolation data and still image interpolation data are adaptively mixed based on changes of pixels included in a field, thus generating image data of a new line.

The IP conversion scheme which generates image data by mixing the moving image and still image interpolation data can be classified into field difference motion adaptive IP conversion and frame difference motion adaptive IP conversion depending on information used to determine the mixing ratio between the moving image interpolation data and still image interpolation data.

The field difference motion adaptive IP conversion is a scheme for determining the mixing ratio based on the difference between a field including a pixel to be interpolated and a field before or after that field (Japanese Patent Laid-Open No. 2006-41619). With this method, if the difference is large, a high mixing ratio of the moving image interpolation data is set. If the difference is small, a high mixing ratio of the still image interpolation data is set.

By contrast, the frame difference motion adaptive IP conversion is a scheme for determining the mixing ratio based on a frame difference of a field including a pixel to be interpolated and fields before and after that field (Japanese Patent Laid-Open No. 2002-185933). With this method as well, if the difference is large, a high mixing ratio of the moving image interpolation data is set. If the difference is small, a high mixing ratio of the still image interpolation data is set.

These field difference motion adaptive IP conversion and frame difference motion adaptive IP conversion have a merit of reducing the number of fields required to execute the IP conversion processing. That is, the number of fields required for the field difference motion adaptive IP conversion is two, and that required for the frame difference motion adaptive IP conversion is three. For this reason, upon implementing an IP conversion processing circuit, the field memory size can be reduced, and the circuit scale can be small, thus allowing implementation at low cost.

Since the field difference motion adaptive IP conversion is an algorithm using a field including a pixel to be interpolated and a field before or after that field, it has a higher time resolution than the frame difference motion adaptive IP conversion. For this reason, the field difference motion adaptive IP conversion can execute the IP conversion processing with high precision in the time direction as its characteristic feature.

In the motion adaptive IP conversion, when the ratio of the moving image interpolation data is higher than the still image interpolation data, since the moving image interpolation is processing in a single field, a frame does not suffer any serious collapse. By contrast, when a moving image is erroneously determined as a still image, a single frame is generated from two fields having different data according to a motion. As a result, the generated data suffers collapse as a picture (for example, the edge of an image is jagged, horizontal stripes stand out, or double images are seen in some cases). For this reason, the conventional motion adaptive IP conversion tends to set a higher ratio of the moving image interpolation data than the still image interpolation data.

The field difference motion adaptive IP conversion inherits such characteristics of the algorithm in the motion adaptive IP conversion, and further requires a special measure. In the field difference motion adaptive IP conversion, since one of fields, for which the difference is to be calculated, includes no spatially corresponding pixels, a difference value is calculated using tentative pixels generated using surrounding pixels of an interpolation position. Hence, the difference value readily becomes large, and in order to prevent collapse as a picture, the ratio of the moving image interpolation data tends to be set higher than the still image interpolation data. However, the converted image has a low vertical resolution unless a still image is correctly determined as a still image.

The existing IP conversion processing specifies the number of fields to be used, and it is difficult to optimize the IP conversion processing precision and the circuit scale upon implementing the algorithm of the IP conversion processing as a processing circuit. The precision of the IP conversion processing can be improved by increasing the number of fields used in determining the mixing ratio. However, when the number of fields to be used is increased, the circuit scale may increase upon implementing the processing circuit. It is not generally desirable since this leads to an increase in development cost of the processing circuit, and a physically large processing circuit size. For this reason, the number of fields to be used needs to be adaptively changed to optimize the IP conversion processing precision and circuit scale. However, the existing IP conversion processing specifies the number of fields to be used, thus disturbing optimization.

An increase in interfield difference data to be used basically improves the precision of the IP conversion processing. However, when fields before and after a field including a pixel to be interpolated are apparently different images, such increase may lower the precision. For example, in case of a scene change, the precision of the IP conversion processing lowers upon increasing the interfield difference data. When a scene change takes place in fields before and after a field including a pixel to be interpolated, it is not preferable to correct the mixing ratio.

SUMMARY OF THE INVENTION

The present invention has been made in consideration of the above problems, and has as its object to provide an IP conversion processing technique with improved precision.

According to one aspect of the present invention, an image processing apparatus for calculating a change predicted value of a pixel value of a pixel of interest included in a field of interest upon generating a progressive video signal from an interlaced video signal, the apparatus comprises:

a plurality of field memories adapted to store each one of sequentially input fields;

a predicted value calculator adapted to calculate a change predicted value before correction of the pixel value of the pixel of interest, based on the field of interest and at least one of fields which neighbors the field of interest and is stored in the plurality of field memories;

one or more coefficient calculation units adapted to respectively calculate interframe difference coefficients based on any of two fields having a field interval of 2 of a plurality of fields stored in the plurality of field memories, and a field which is being input;

a correction value calculation unit adapted to calculate a correction value of the change predicted value based on the interframe difference coefficients calculated by the coefficient calculation units; and a correction unit adapted to correct the change predicted value before correction calculated by the change predicted value calculator based on the correction value calculated by the correction value calculation unit and output a change predicted value after correction.

According to another aspect of the present invention, a control method of controlling an image processing apparatus which calculates a change predicted value of a pixel value of a pixel of interest included in a field of interest upon generating a progressive video signal from an interlaced video signal, and comprises a plurality of field memories adapted to store each one of sequentially input fields, the method comprises:

a predicted value calculation step of calculating a change predicted value before correction of the pixel value of the pixel of interest based on the field of interest and at least one of fields which neighbors the field of interest and is stored in the plurality of field memories;

one or more interframe difference coefficient calculation steps of respectively calculating interframe difference coefficients based on any of two fields having a field interval of 2 of a plurality of fields stored in the plurality of field memories, and a field which is being input;

a correction value calculation step of calculating a correction value of the change predicted value based on the interframe difference coefficients calculated in the coefficient calculation steps; and a correction step of correcting the change predicted value before correction calculated in the change predicted value calculation step based on the correction value calculated in the correction value calculation step and outputting a change predicted value after correction.

Further features of the present invention will become apparent from the following description of exemplary embodiments with reference to the attached drawings.

DESCRIPTION OF THE EMBODIMENTS

Embodiments according to the present invention will be described in detail hereinafter with reference to the accompanying drawings. However, components described in the embodiments are merely examples, and the scope of the present invention is not limited to them.

First Embodiment (Predicted Value Calculation Apparatus)

Figure 1:
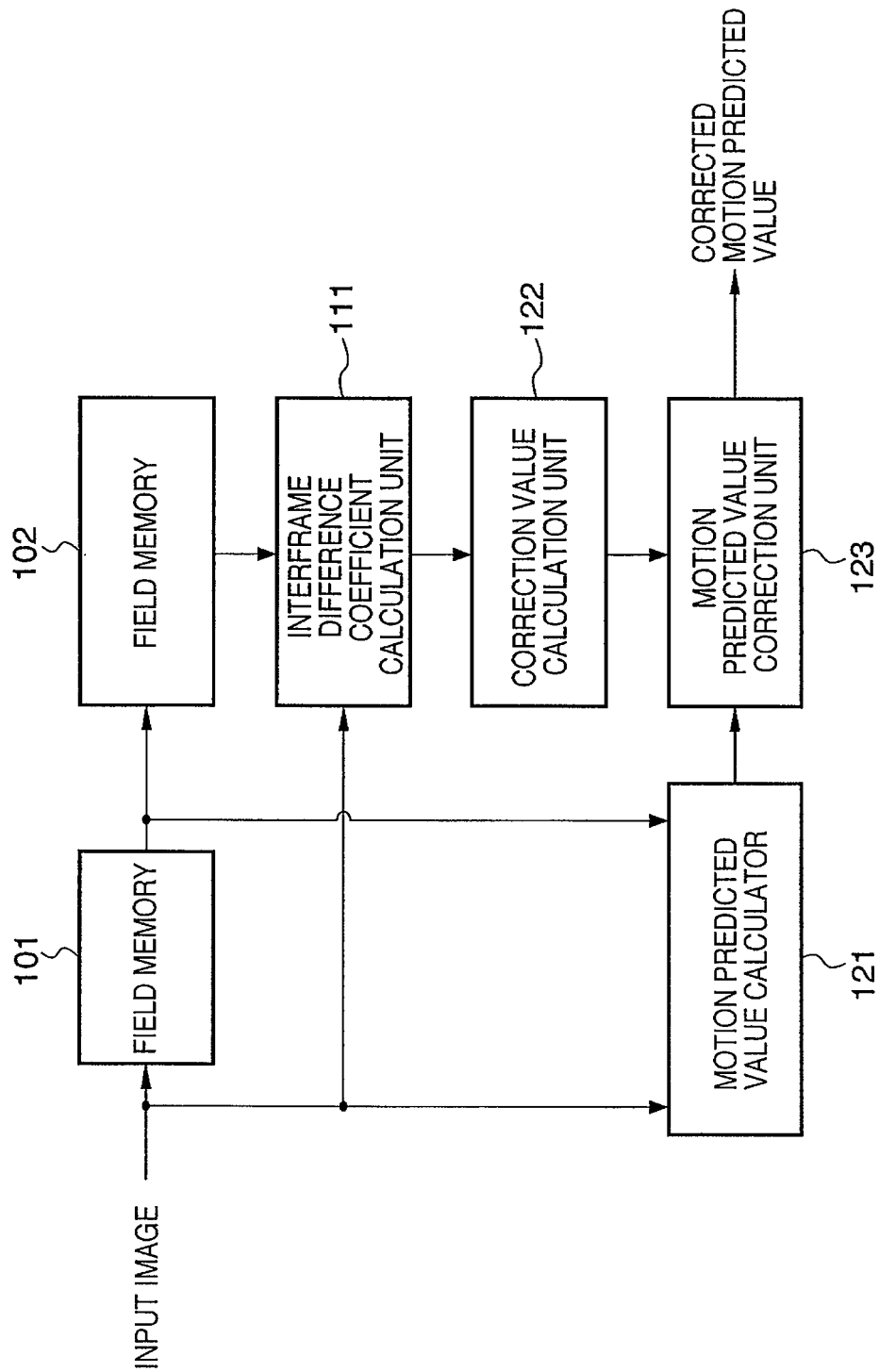
FIG. 1 is a block diagram showing the arrangement of a motion predicted value calculation apparatus.

The arrangement of a predicted value calculation apparatus (change predicted value calculation apparatus) according to this embodiment will be described first with reference to FIG. 1. FIG. 1 is a block diagram showing the arrangement of a motion predicted value calculation apparatus according to this embodiment. This motion predicted value calculation apparatus calculates a change predicted value of a pixel value in a pixel of interest included in a field of interest upon generation of a progressive video signal from an interlaced video signal.

Referring to FIG. 1, reference numerals 101 and 102 denote field memories, which sequentially store image data for one field of an input image. In FIG. 1, new fields are sequentially input to the field memory 101. As will be described later, the field memory stores one of a field of interest, a field ahead of the field of interest, and a field following the field of interest.

Reference numeral 121 denotes a motion predicted value calculator (change predicted value calculator), which calculates a motion predicted value (change predicted value) based on the input image and a field image stored in the field memory 101. Reference numeral 111 denotes interframe difference coefficient calculation unit, which calculates interframe difference coefficients based on the input image and a field image stored in the field memory 102. As will be described later, the interframe difference coefficient calculation unit 111 calculates interframe difference coefficients based on one of two fields having a field interval=2 of a plurality of fields stored in the field memories and a field which is being input.

Reference numeral 122 denotes a correction value calculation unit, which calculates a correction value for the motion predicted value calculated by the motion predicted value calculator 121 based on the interframe difference coefficients output from the interframe difference coefficient calculation unit 111. Reference numeral 123 denotes a motion predicted value correction unit (change predicted value correction unit) which receives the motion predicted value calculated by the motion predicted value calculator 121 and the correction value calculated by the correction value calculation unit 122, and corrects the motion predicted value.

Note that the motion predicted value is a change (degree of change) in pixel value at a pixel of interest position, i.e., a parameter indicating the degree of motion. A value that the motion predicted value can assume ranges from 0 to 1 (both inclusive). When the motion predicted value assumes a value closer to 1, it is predicted that an image is more likely to have a motion at the pixel of interest position, and an interpolated pixel is generated using moving image interpolation data. When the motion predicted value assumes a value closer to zero, it is predicted that an image is more likely to be in a still state at the pixel of interest position, and an interpolated pixel is generated using still image interpolation data.

(Overview of Motion Predicted Value Correction Operation)

An overview of the motion predicted value correction operation in the motion predicted value calculation apparatus with the above arrangement will be described below.

Prior to the processing, the contents of the field memories 101 and 102 are all reset to zero. When image data for one field is input to the motion predicted value calculation apparatus, the input image is input to and stored in the field memory 101. Upon input of image data of the next field, the image data stored in the field memory 101 is stored in the field memory 102, and a new field image is stored in the field memory 101. Furthermore, the new field image and the field image delayed by the field memory 102 are input to the interframe difference coefficient calculation unit 111.

(Calculation of Motion Predicted Value)

Practical processing for calculating the motion predicted value in the motion predicted value calculator 121 will be described below. The motion predicted value calculator 121 calculates a motion predicted value before correction based on one of the following pixels:

pixels included in two lines which are included in the field of interest and neighbor the pixel of interest; and pixels which are included in fields that neighbor the field of interest held in the field memory and which are located at the position of the pixel of interest.

An example of the arrangement of the motion predicted value calculator 121 which executes such processing will be described below.

Figure 2:
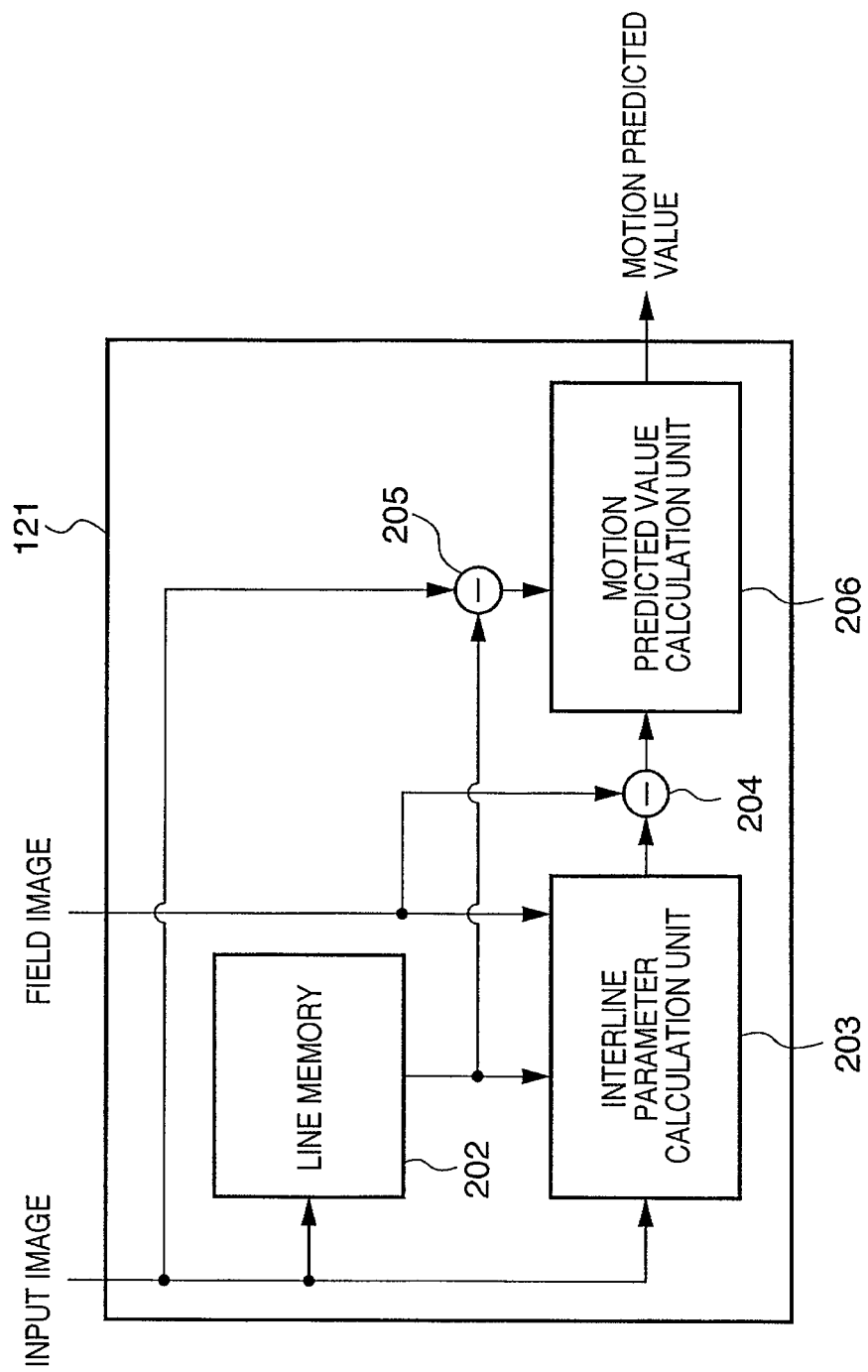
FIG. 2 is a block diagram showing the arrangement of a motion predicted value calculator included in the motion predicted value calculation apparatus.

FIG. 2 is a block diagram showing the arrangement of the motion predicted value calculator 121 included in the motion predicted value calculation apparatus according to this embodiment. The motion predicted value calculator 121 calculates a motion predicted value based on the input image and a field image stored in the field memory 101.

Referring to FIG. 2, reference numeral 202 denotes a line memory, which sequentially stores image data for one line of the input image. Reference numeral 203 denotes an interline parameter calculation unit, which calculates an interline parameter based on the input image, image data for several lines delayed by a 1-line period by the line memory 202, and a field image stored in the field memory 101. Reference numerals 204 and 205 denote subtractors. The subtractor 204 outputs a difference value using a field image stored in the field memory 101, and the interline parameter calculated by the interline parameter calculation unit 203. The subtractor 205 outputs a difference value using the input image and image data delayed by a 1-line period by the line memory 202. Reference numeral 206 denotes a motion predicted value calculation unit, which receives the difference values output from the subtractors 204 and 205, and calculates a motion predicted value.

Figure 10:
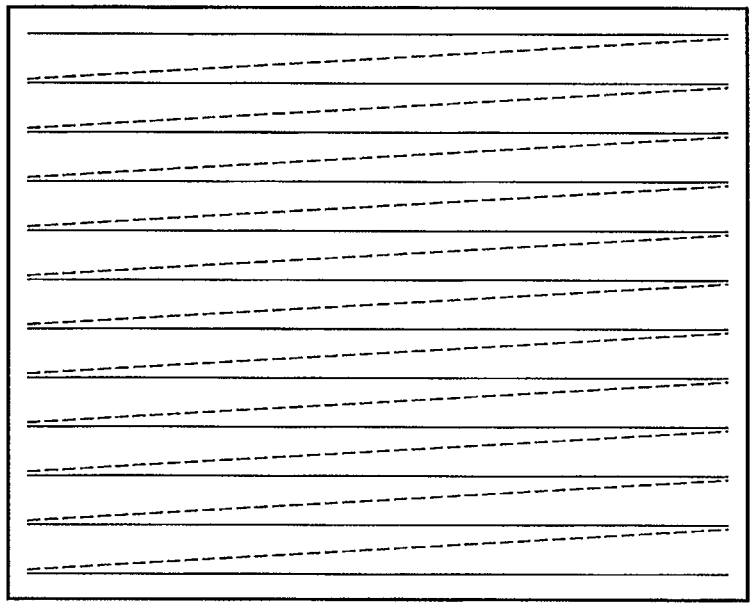
FIG. 10 is a view showing a scan order of an interlace signal format.

The motion predicted value calculation operation in the motion predicted value calculator 121 with the above arrangement will be described below. Prior to the processing, the contents of the line memory 202 are all reset to zero. The line memory 202 sequentially stores one line from the input image, as shown in FIG. 10. FIG. 10 shows the scan order of the interlace signal format. The scan order of lines may start from the upper left position or lower left position of the input image.

(Calculation of Interline Parameter)

Figure 3:
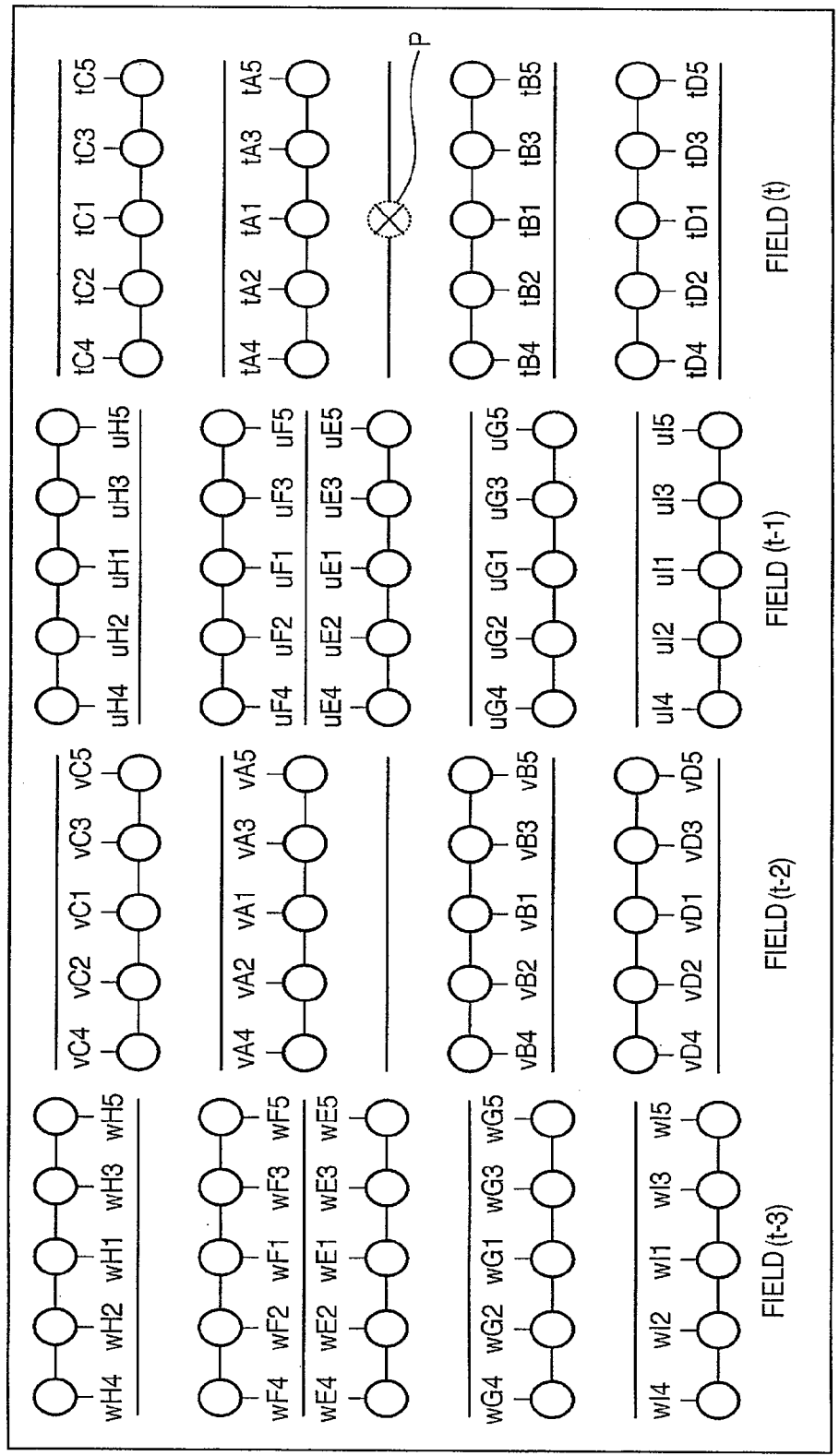
FIG. 3 is a view showing a time-serial change in field data.

The calculation processing of an interline parameter D in the interline parameter calculation unit 203 will be described below with reference to FIG. 3. FIG. 3 shows a time-series change in field data. Referring to FIG. 3, field data (t) is a pattern diagram of input image data including an interpolated pixel position P created by the motion predicted value calculation apparatus. Field data (t−1) is a pattern diagram of field data one time before, which neighbors the field data (t). Field data (t−2) is a pattern diagram of field data one time before, which neighbors the field data (t−1). Field data (t−3) is a pattern diagram of field data (t−3) one time before, which neighbors the field data (t−2).

The interline parameter is calculated using the following pieces of information:

the input image;

pixels included in upper and lower neighboring lines of the lateral interpolated pixel position P, included in one line delayed by the line memory 202; and a pixel uE1 which is included in the field data (t−1) and spatially corresponds to the interpolated pixel position P and its neighboring pixels.

The pixels included in the upper and lower neighboring lines of the lateral interpolated pixel position P included in one line delayed by the line memory 202 correspond to, e.g., tA1 to tA5 and tB1 to tB5 in FIG. 3. The pixel uE1 which is included in the field data (t−1) and spatially corresponds to the interpolated pixel position P and its neighboring pixels correspond to, e.g., uE2 to uE5, uF1 to uF5, uG1 to uG5, uH1 to uH5, and uI1 to uI5 in FIG. 3.

One or more of these pixels can be used in combination. Practical interline parameter calculation processing will be exemplified below. This calculation processing is an example, and any other methods may be used as long as the interline parameter is calculated based on at least any of the input image, field image, and output from the line memory 202.

Practical calculation processing of the interline parameter is as follows. As a first step of processing, using pixels A, B, and E, we have:

IF $(|tA1-uE1|<|tB1-uE1|)D=tA1$

ELSE $D=tB1$ (1)

That is, one, which has a pixel value close to uE1, of tA1 and tB1 can be adapted as the interline parameter.

As a second step of processing, using pixels tA1 and tB1, we have:

$D=\text{AVERAGE2}(tA1,tB1)$ (2)

The average value of tA1 and tB1 may be adapted as the interline parameter. Note that AVERAGE2(parameter1, parameter2) is a function which returns an average value E of two pixels, as given by:

$E=(\text{parameter1}+\text{parameter2})/2$ (3)

As a third step of processing, using pixels tA1 to tA5 and tB1 to tB5, and uE1, D can be calculated by:

$V=\text{AVERAGE5}(tA1,tA2,tA3,tA4,tA5)$ $W=\text{AVERAGE5}(tB1,tB2,tB3,tB4,tB5)$ IF $(|V-uE1|<|W-uE1|)D=V$

ELSE $D=W$ (4)

With this scheme, one, which has a pixel value closer to uE1, of the pixel average values of the upper and lower neighboring lines is adapted as the interline parameter.

Note that AVERAGE5(parameter1, parameter2, parameter3, parameter4, parameter5) is a function which returns an average value E of five pixels, as given by:

$E=(\text{parameter1}+\text{parameter2}+\text{parameter3}+\text{parameter4}+\text{parameter5})/5$ (5)

The subtractor 204 outputs a difference value (interfield motion amount) F based on the inputs of the interline parameter D, the pixel uE1 which is included in the field data (t−1) and spatially corresponds to the interpolated pixel position P, and its neighboring pixels. The neighboring pixels of the pixel uE1 include, e.g., uE2 to uE5, uF1 to uF5, uG1 to uG5, uH1 to uH5, and uI1 to uI5 in FIG. 3. As a practical example of a calculation by the subtractor 204, we have:

$F=|D-uE1|$ (6)

The subtractor 205 outputs a difference (intrafield motion amount) G using pixels included in the upper and lower neighboring lines of the interpolated pixel position P. As a practical example, we have:

$G=|tA1-tB1|$ (7)

The practical processing of the calculation of the intrafield motion amount G is not limited to the above example as long as it is done based on the input image and line memory 202.

The motion predicted value calculation unit 206 outputs a motion predicted value X using the interfield motion amount F output from the subtractor 204 and the intrafield motion amount G output from the subtractor 205. As an example of practical processing, the predicted value X can be calculated by:

IF $(G=0)X=1$

ELSE IF $(F=0)X=0$

ELSE $X=F/G$ (8)

Note that the motion predicted value assumes a value ranging from 0 to 1, and represents the state of a pixel to be interpolated as follows:

$X=0$ perfect still state $X=1$ perfect motion state $0<X<1$ still and motion mixed state (9)

The motion predicted value calculated in this way is input to the predicted value correction unit 123.

(Calculation of Interframe Difference Coefficients)

The calculation processing of the interframe difference coefficients in the interframe difference coefficient calculation unit 111 will be described below. The interframe difference coefficient calculation unit 111 calculates interframe difference coefficients based on differences between pixels, which are included in a predetermined region having the position of the pixel of interest as the center and are located at identical positions, between two fields having a field interval=2. As described above, in FIG. 3, the field (t) is input image data. The field (t−1) is image data held in the field memory 101. The field (t−2) is image data held in the field memory 102. The field (t−3) is image data one field older than the image data held in the field memory 102.

As the interframe difference coefficients, pixels which are included in the field (t) and neighbor the interpolated pixel position P and those which included in the field (t−2) and neighbor the interpolated pixel position P are used, the difference between a pair of spatially corresponding pixels in the fields (t) and (t−2) is calculated for each pixel. The pixels which are included in the field (t) and neighbor the interpolated pixel position P correspond to, e.g., 20 pixels, i.e., tA1 to tA5 in the line immediately above the interpolated pixel position P, tB1 to tB2 in the line immediately below the interpolated pixel position P, tC1 to tC5 in the line two lines above, and tD1 to tD5 in the line two lines below in FIG. 3. The pixels which are included in the field (t−2) and neighbor the interpolated pixel position P correspond to, e.g., 20 pixels, i.e., vA1 to vA5, vB1 to vB5, vC1 to vC5, and vD1 to vD5 in FIG. 3. The pair of spatially corresponding pixels means a pair of pixels which are located at equal coordinates in the two fields like a pair of tA1 and vA1 and a pair of tB2 and vB2.

The interframe difference calculation unit 111 performs checking using a threshold th1 for the calculated difference values of the pairs of spatially corresponding pixels, i.e., checks the magnitude relationship with the threshold th1. Then, the unit 111 outputs, as interframe difference coefficients, the number J of difference values and the number of difference values which are significant values with respect to the threshold th1, i.e., the number K of difference values which are equal to or larger than the threshold th1.

Note that the pixels which are included in the field (t) and neighbor the interpolated pixel position P may be acquired from combinations other than that described above. Also, the pixels which are included in the field (t−2) and neighbor the interpolated pixel position P may be acquired from combinations other than that described above. A plurality of (e.g., 20) pairs of spatially corresponding pixels need only be acquired using these pixels.

Using the input image and the field image obtained from the field memory 102, a pair of field data having a field interval=2 can be acquired. Hence, the interframe difference coefficients are calculated using the fields (t) and (t−2). However, the field data to be used need only have a field interval=2, and for example, the fields (t−1) and (t−3) may be used.

In the above description, since the fields (t) and (t−2) have an even field interval from the field (t), the interframe difference coefficients are calculated using 20 pixels. However, if the field interval from the field (t) is odd, the interframe difference coefficients are calculated using 25 pixels. The calculation processing of the interframe difference coefficients using the fields (t−1) and (t−3) when the field interval from the field (t) is odd will be described below.

Using 25 pixels which are included in the field (t−1) and neighbor the interpolated pixel position P, and 25 pixels which are included in the field (t−3) and neighbor the interpolated pixel position P, the difference values between pairs of spatially corresponding pixels of the fields (t−1) and (t−3) are calculated for respective pixels. As the pixels which are included in the field (t−1) and neighbor the interpolated pixel position P, for example, uE1 to uE5, uF1 to uF5, uG1 to uG5, uH1 to uH5, and uI1 to uI5 in FIG. 3 can be used. As the pixels which are included in the field (t−3) and neighbor the interpolated pixel position P, for example, wE1 to wE5, wF1 to wF5, wG1 to wG5, wH1 to wH5, and wI1 to wI5 in FIG. 3 can be used.

The calculated difference values of the pairs of spatially corresponding pixels are compared with the threshold th1. The number J of difference values, and the number of difference values which assume significant values with respect to the threshold th1, that is, the number K of difference values which are equal to or larger than the threshold th1 are output as the interframe difference coefficients. The interframe difference coefficients calculated in this way are input to the correction value calculation unit 122.

(Calculation of Correction Value)

The calculation processing of a correction value in the correction value calculation unit 122 will be described below. A correction value L is expressed by a ratio of J and K of the interframe difference coefficients using the input interframe difference coefficients as follows.

$$L = \frac{\sum_{1}^{n} Kn}{\sum_{1}^{n} Jn} \quad (10)$$

where n is the number of interframe difference coefficients (J, K) calculated by the interframe difference coefficient calculation unit 111. In this embodiment, n=1 since the number of interframe difference coefficients (J, K) calculated by the interframe difference coefficient calculation unit 111 is one per pixel.

Note that in the first embodiment, the number of interframe difference coefficients input to the correction value calculation unit 122 is one. However, the number of interframe difference coefficients input to the correction value calculation unit need only be one or more. That is, a plurality of interframe difference coefficients may be input.

(Correction of Motion Predicted Value)

The calculation processing of the corrected motion predicted value (correction processing of the motion predicted value) in the motion predicted value correction unit 123 will be described below. The motion predicted value correction unit 123 corrects the motion predicted value output from the motion predicted value calculator 121 using the correction value output from the correction value calculation unit 122, and outputs a corrected motion predicted value. Correction of the motion predicted value is described by:

$$M' = L \times M \quad (11)$$

(where M': a corrected motion predicted value, M: a motion predicted value, L: correction value)

The range of values that the motion predicted value can assume is:

$$0 \leq M \leq 1 \quad (12)$$

As described above, in the predicted value calculation apparatus according to this embodiment, the motion predicted value calculator 121 calculates a motion predicted value of a predicted pixel at the same position as the pixel of interest position using an input field and a field held in the field memory 101. Then, interframe difference coefficients are calculated using a surrounding field pair (the input field and a field held in the field memory 102). Then, a correction value for the motion predicted value is calculated based on the interframe difference coefficients, thus correcting the motion predicted value.

As described above, in the arrangement according to this embodiment, the basic field difference motion adaptive IP conversion processing is developed to use a field including a pixel to be interpolated and one of fields before and after that field, and also their surrounding fields. Using more interfield difference data from these fields, the mixing ratio is corrected to improve the precision of the IP conversion processing.

Note that this embodiment has been described under the condition that image information held in each field memory includes luminance signals on a YCC color space. Alternatively, color difference signals may be used or respective pieces of color information on an RGB color space may be used.

Second Embodiment

Figure 4:
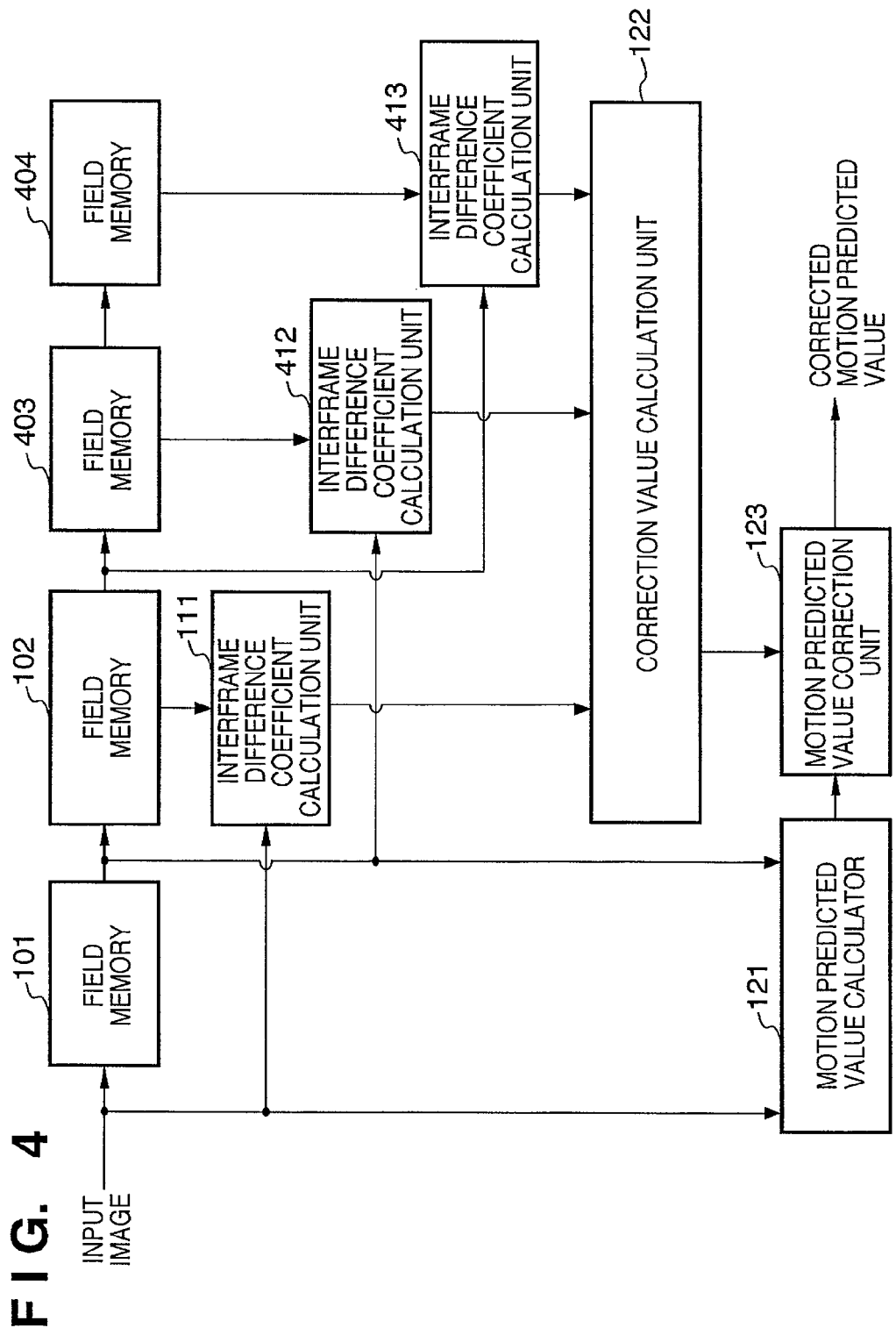
FIG. 4 is a block diagram showing the arrangement of a motion predicted value calculation apparatus.

FIG. 4 is a block diagram showing the arrangement of a predicted value calculation apparatus according to this embodiment. The same reference numerals in FIG. 4 denote components which have the same functions as those in FIG. 1 of the first embodiment, and a repetitive description thereof will be avoided.

Referring to FIG. 4, reference numerals 403 and 404 denote field memories, each of which sequentially stores image data for one field of an input image. Reference numerals 412 and 413 denote interframe difference coefficient calculation units. The interframe difference coefficient calculation unit 412 receives a field image stored in the field memory 101 and that stored in the field memory 403, and calculates interframe difference coefficients. The interframe difference coefficient calculation unit 413 receives a field image stored in the field memory 102 and that stored in the field memory 404, and calculates interframe difference coefficients.

The motion predicted value correction operation in the motion predicted value calculation apparatus with the above arrangement will be described below. The contents of the field memories 101, 102, 403, and 404 are reset to all zeros. When image data for one field is input to the motion predicted value calculation apparatus, the image data is input to and stored in the field memory 101.

When the next field image data is input, the field image stored in the field memory 101 is stored in the field memory 102; and a new field image is stored in the field memory 101.

When the next field image data is input, the field image stored in the field memory 102 is stored in the field memory 403;

the field image stored in the field memory 101 is stored in the field memory 102; and a new field image is stored in the field memory 101.

When the next field image data is input, the field image stored in the field memory 403 is stored in the field memory 404;

the field image stored in the field memory 102 is stored in the field memory 403;

the field image stored in the field memory 101 is stored in the field memory 102; and a new field image is stored in the field memory 101.

On the other hand, the new field image and the field image delayed by the field memory 102 are input to the interframe difference coefficient calculation unit 111. The field image delayed by the field memory 101 and that delayed by the field memory 403 are input to the interframe difference coefficient calculation unit 412. The field image delayed by the field memory 102 and that delayed by the field memory 404 are input to the interframe difference coefficient calculation unit 413.

For example, assume that a newly input field image is a field (t). In this case, the field images stored in the field memories 101, 102, 403, and 404 are respectively fields (t−1), (t−2), (t−3), and (t−4). Therefore, the interframe difference coefficient calculation unit 111 calculates interframe difference coefficients J(t) and K(t) based on the fields (t) and (t−2) (where J(t) and K(t) are interframe difference coefficients J and K calculated based on the fields (t) and (t−2).

Likewise, the interframe difference coefficient calculation unit 412 calculates interframe difference coefficients J(t−1) and K(t−1) based on the fields (t−1) and (t−3). The interframe difference coefficient calculation unit 413 calculates interframe difference coefficients J(t−2) and K(t−2) based on the fields (t−2) and (t−4).

The correction value calculation unit 122 calculates a correction value L using equation (10) based on the interframe difference coefficients J(t), K(t), J(t−1), K(t−1), J(t−2), and K(t−2) calculated by the interframe difference coefficient calculation units 111, 412, and 413. That is, the correction value L is can be calculated by:

$$L=(K(t)+K(t-1)+K(t-2))/(J(t)+J(t-1)+J(t-2))$$

Note that the correction value L is used to correct the motion predicted value in the motion predicted value correction unit 123.

As described above, the motion predicted value calculation apparatus described in this embodiment calculates the correction value based on five field images from four (unit) times before to the current time for the motion predicted value calculated by the motion predicted value calculator 121. The apparatus corrects the motion predicted value using that correction value. For this reason, with the arrangement according to this embodiment, since the five field images are used to calculate the correction value, the correction value can be calculated with higher precision.

More specifically, the predicted value calculation apparatus according to this embodiment calculates a correction value for a motion predicted value of a predicted pixel located at the same position as the pixel of interest position based on the interframe difference coefficients calculated using surrounding field pairs, and corrects the motion predicted value. Note that the motion predicted value calculator 121 calculates the motion predicted value of the predicted pixel located at the same position as the pixel of interest position using the fields (t) and (t−1). The surrounding field pairs include:

a pair of the input field and the field held in the field memory 102;

a pair of the fields stored in the field memories 101 and 403; and a pair of the fields stored in the field memories 102 and 404.

As described above, according to this embodiment, since the correction value is calculated using information of more fields, and the motion predicted value is corrected, a motion predicted value with higher precision can be calculated.

Note that this embodiment has been described under the condition that image information held in each field memory includes luminance signals on a YCC color space. Alternatively, color difference signals may be used or respective pieces of color information on an RGB color space may be used.

Third Embodiment

Figure 5:
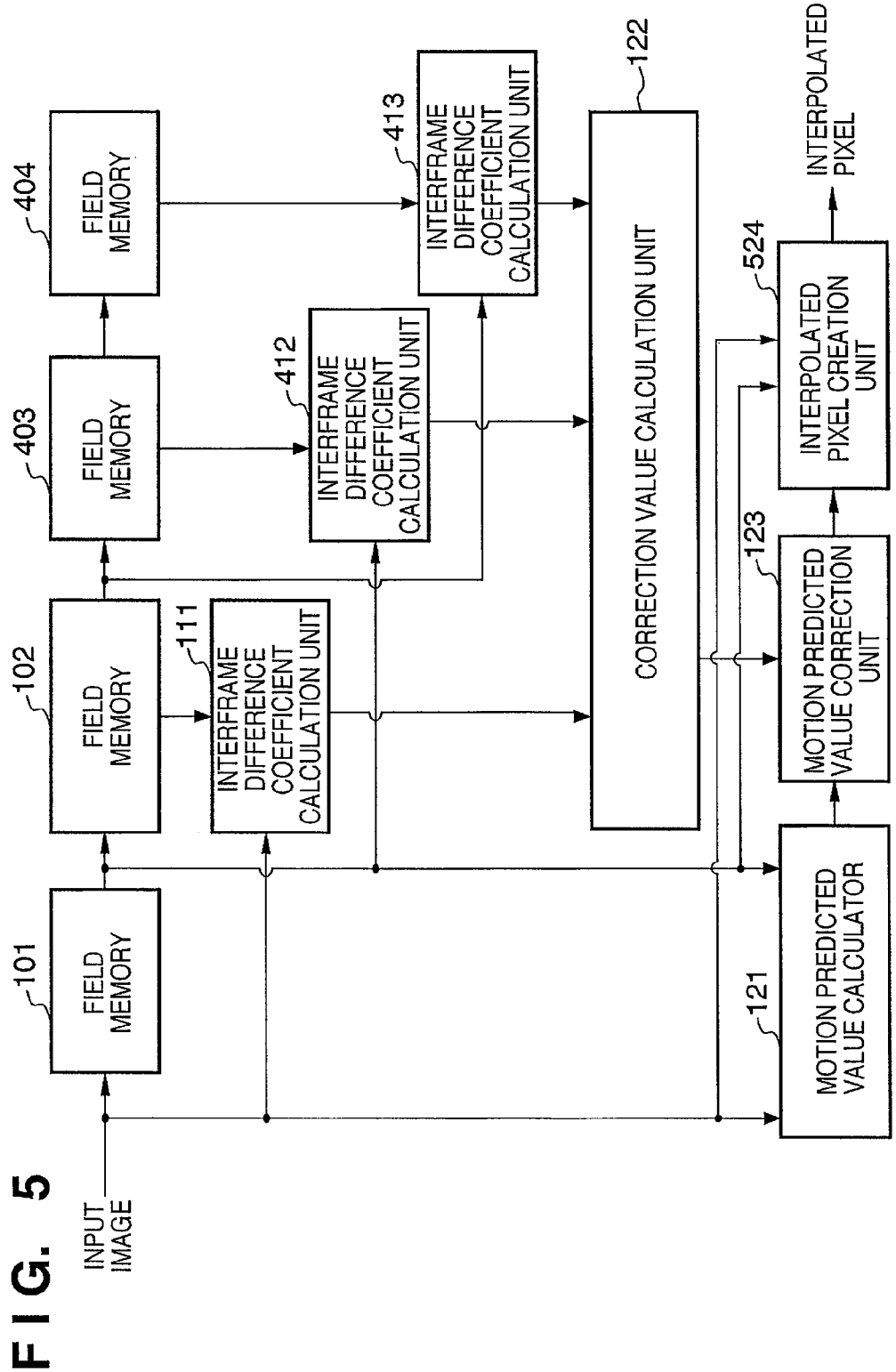
FIG. 5 is a block diagram showing the arrangement of an IP conversion processing apparatus.

FIG. 5 is a block diagram showing the arrangement of an IP conversion processing apparatus according to this embodiment. The same reference numerals in FIG. 5 denote components which have the same functions as those of FIG. 1 of the first embodiment and FIG. 4 of the second embodiment, and a repetitive description thereof will be avoided. Referring to FIG. 5, reference numeral 524 denotes an interpolated pixel creation unit which creates an interpolated pixel using an input image, a field image output from the field memory 101, and the corrected motion predicted value output from the motion predicted value correction unit 123.

The IP conversion processing operation in the IP conversion processing apparatus with the above arrangement will be described below. The creation processing of an interpolated pixel of the interpolated pixel creation unit 524 will be described first. A still determination pixel N is calculated using uE1 included in the field (t−1) shown in FIG. 3. A motion determination pixel Q is calculated using pixels (tA1 to tA5 and tB1 to tB5) included in the upper and lower neighboring lines of a pixel P to be interpolated included in the field (t). This pixel Q is calculated using:

$$Q=\text{AVERAGE2}(tA1, tB1) \tag{13}$$

An interpolated pixel P' is generated using the still determination pixel N, motion determination pixel Q, and a corrected motion predicted value M' by:

$$P'=Q\times M'+N\times(1-M') \tag{14}$$

As described above, in the predicted value calculation apparatus described in this embodiment, the motion predicted value calculator 121 calculates a motion predicted value of a predicted pixel at the same position as the pixel of interest position using the fields (t) and (t−1). The apparatus then calculates a correction value for the motion predicted value based on the interframe difference coefficients calculated using surrounding field pairs. The surrounding field pairs include:

a pair of the input field and the field held in the field memory 102;

a pair of the fields stored in the field memories 101 and 403; and a pair of the fields stored in the field memories 102 and 404.

For this reason, an interpolated pixel with higher precision can be created.

As can be seen from the descriptions throughout the first to third embodiments, the number of interframe difference coefficients required to calculate the correction value can be changed depending on the number of field memories used. By increasing the number of field memories, the precision of IP conversion tends to improve, while the circuit scale increases. In this embodiment, the function of calculating the motion predicted value and the function of correcting the motion predicted value are clearly separated. For this reason, the number of field memories to be used can be easily changed within the range from 2 to infinity as usage. In other words, the arrangement according to this embodiment adopts a block structure that easily allows to adaptively change the number of interfield difference data used to correct the mixing ratio. That is, the number of fields to be used is variable, and the number of interframe difference coefficients to be calculated is also variable. For this reason, the precision of the IP conversion processing and the circuit scale can be easily optimized.

Note that this embodiment has been described under the assumption that image information held in each field memory includes luminance signals on a YCC color space. Alternatively, color difference signals may be used or respective pieces of color information on an RGB color space may be used.

Fourth Embodiment

Figure 6:
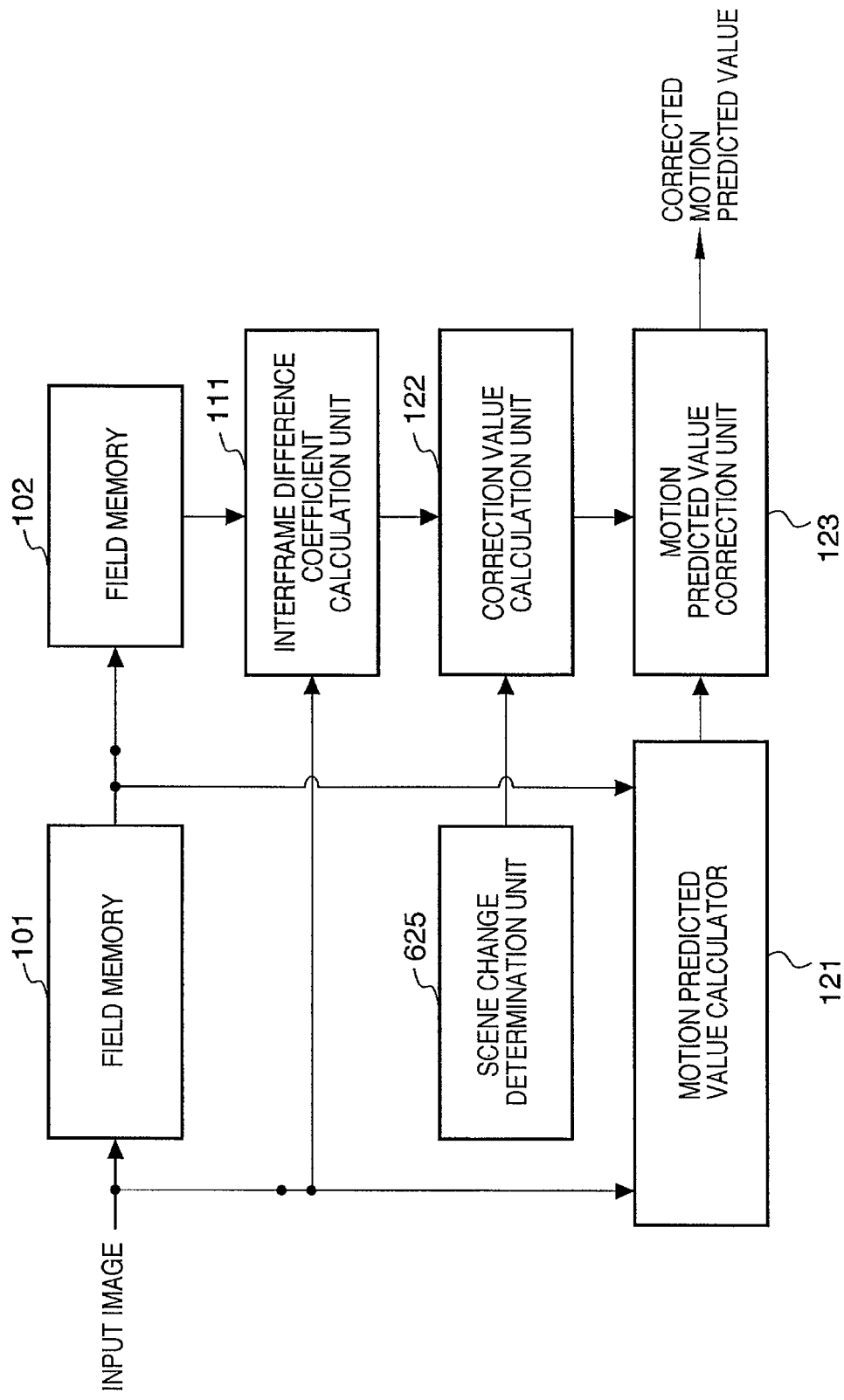
FIG. 6 is a block diagram showing the arrangement of a motion predicted value calculation apparatus.

FIG. 6 is a block diagram showing the arrangement of a predicted value calculation apparatus according to this embodiment. The same reference numerals in FIG. 6 denote components which have the same functions as those in FIG. 1 of the first embodiment, and a repetitive description thereof will be avoided. Referring to FIG. 6, reference numeral 625 denotes a scene change determination unit which makes scene change determination, and outputs the determination result to the correction value calculation unit 122.

The fourth embodiment is different from the first embodiment in that the scene change determination unit 625 makes scene change determination, and the calculation processing of the correction value of the correction value calculation unit 122 is controlled based on the determination result. An input to the scene change determination unit can be a field memory pair having a field interval=2. However, the present invention is not limited to this. For example, scene numbers stored in advance in an external memory may be input.

The scene change determination unit 625 makes scene change determination, and outputs the determination result to the correction value calculation unit 122. The format of the determination result is expressed by "determination result: the distance between a determination result calculation field pair and motion predicted value calculation field pair".

The correction value calculation processing of the correction value calculation unit 122 using the determination result output from the scene change determination unit 625 will be described below. The correction value calculation unit 122 outputs a correction value using the determination result obtained by the scene change determination unit 625 and the interframe difference coefficients calculated by the interframe difference coefficient calculation unit 111.

Figure 7:
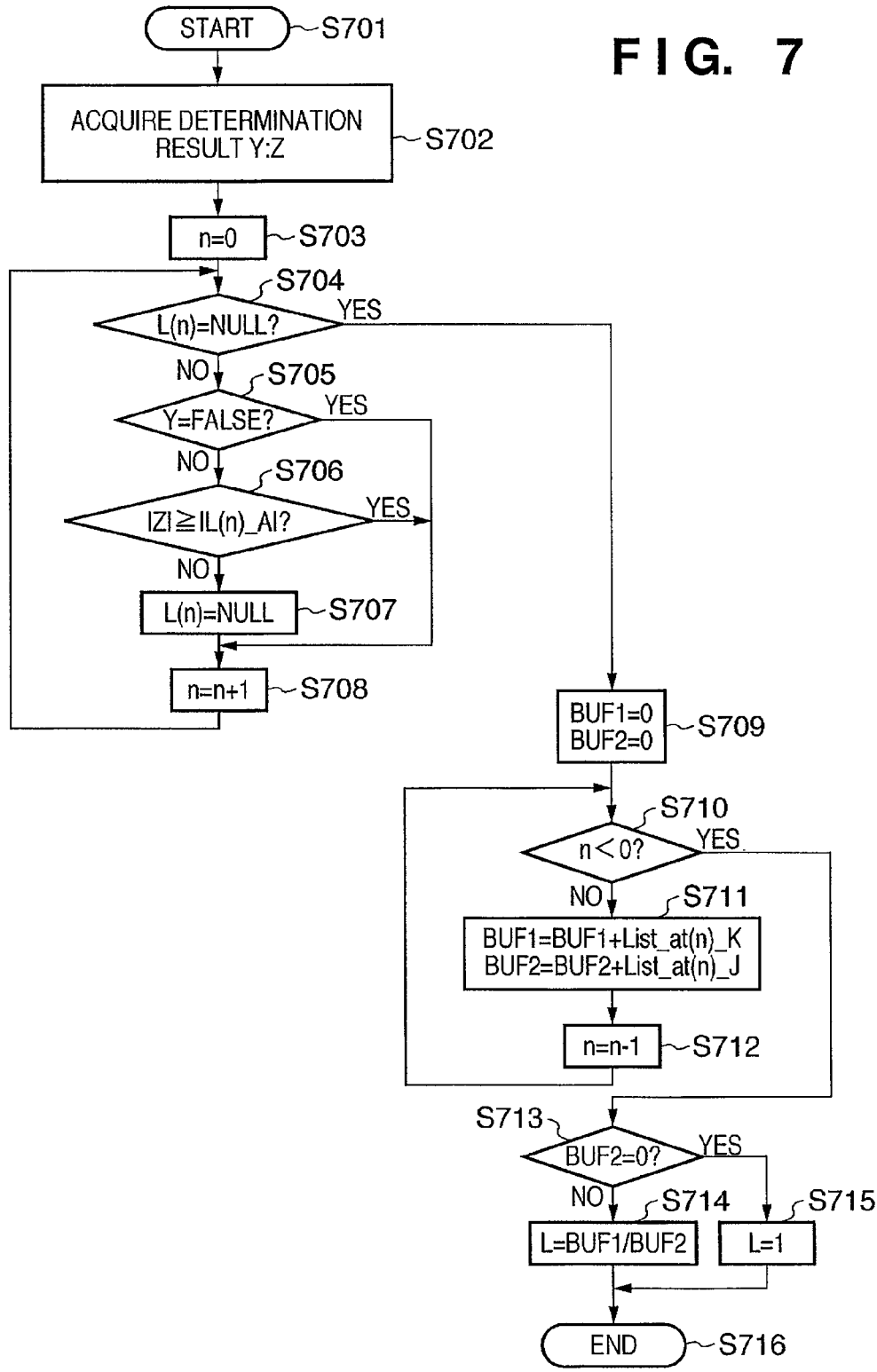
FIG. 7 is a flowchart showing the calculation sequence of a correction value by a correction value calculator.

FIG. 7 is a flowchart showing the calculation sequence of a correction value by the correction value calculation unit 122 using the determination result obtained by the scene change determination unit 625 and the interframe difference coefficients calculated by the interframe difference coefficient calculation unit 111. Note that the correction value calculation unit 122 comprises an arithmetic device such as a CPU (Central Processing Unit) or the like, and executes the processing shown in FIG. 7 under the control of the CPU.

Referring to FIG. 7, the correction value calculation unit 122 starts processing from step S701. After the processing in step S701, the correction value calculation unit 122 executes processing in step S702. In step S702, the unit 122 acquires the determination result output from the scene change determination unit 625. After the processing in step S702, the correction value calculation unit 122 executes processing in step S703. In step S703, the unit 122 initializes a counter of the number of interframe difference coefficients by zero.

After the processing in step S703, the correction value calculation unit 122 executes processing in step S704. The unit 122 checks in step S704 if the number of interframe difference coefficients has reached an upper limit. If the number of interframe difference coefficients has reached an upper limit (YES in step S704), the unit 122 executes processing in step S709; otherwise (NO in step S704), it executes processing in step S705.

The correction value calculation unit 122 checks in step S705 if the determination result is false. If the determination result is false (YES in step S705), the unit 122 executes processing in step S708; otherwise (NO in step S705), it executes processing in step S706.

The correction value calculation unit 122 checks in step S706 which of a field pair used to calculate the interframe difference coefficients and that used to output the determination result has a larger frame interval than a field pair used to calculate the motion predicted value. If the field pair used to output the determination result has a larger field interval (YES in step S706), the unit 122 executes processing in step S708; otherwise (NO in step S706), it executes processing in step S707.

In step S707, the correction value calculation unit 122 clears interframe difference coefficients to zero. After the processing in step S707, the correction value calculation unit 122 executes processing in step S708. In step S708, the unit 122 increments the counter of the number of interframe difference coefficients by one. After the processing in step S708, the unit 122 executes the processing in step S704.

In step S709, the correction value calculation unit 122 initializes BUF1 and BUF2 by zero. After the processing in step S709, correction value calculation unit 122 executes processing in step S710. The correction value calculation unit 122 checks in step S710 if the number of interframe difference coefficients has reached an upper limit. If the number of interframe difference coefficients has reached an upper limit (YES in step S710), the unit 122 executes processing in step S713; otherwise (NO in step S710), it executes processing in step S711.

In step S711, the correction value calculation unit 122 adds K of the interframe difference coefficients to BUF1, and J of the interframe difference coefficients to BUF2. After the processing in step S711, the correction value calculation unit 122 executes processing in step S712. In step S712, the unit 122 increments the counter of the number of interframe difference coefficients by one.

After the processing in step S712, the correction value calculation unit 122 executes the processing in step S710. The unit 122 checks in step S713 if BUF2=0. If BUF2=0 (YES in step S713), the unit 122 executes processing in step S715; otherwise (NO in step S713), it executes processing in step S714.

In step S714, the correction value calculation unit 122 calculates a correction value L by dividing BUF1 by BUF2. After the processing in step S714 the correction value calculation unit 122 executes processing in step S716. In step S715, the unit 122 sets the correction value L to be 1. After the processing in step S715, the correction value calculation unit 122 executes processing in step S716. In step S716, the unit 122 ends the processing.

As described above, this embodiment determines a scene change, and corrects the mixing ratio using suitable interfield difference data. For this reason, the precision of the IP conversion processing can be further improved.

More specifically, the predicted value calculation apparatus according to this embodiment executes the following processing when there is a field inapplicable as image information used to correct the motion predicted value calculated by the motion predicted value calculator 121 due to occurrence of a scene change. That is, the scene change determination unit 625 specifies a field pair where a scene change has occurred, and the correction value calculation unit calculates a correction value without using the interframe difference coefficients calculated based on a field inapplicable to correction using the scene change determination result. For this reason, the motion predicted value with higher precision can be calculated.

Note that this embodiment has been described under the assumption that image information held in each field memory includes luminance signals on a YCC color space. Alternatively, color difference signals may be used or respective pieces of color information on an RGB color space may be used.

Fifth Embodiment

Figure 8:
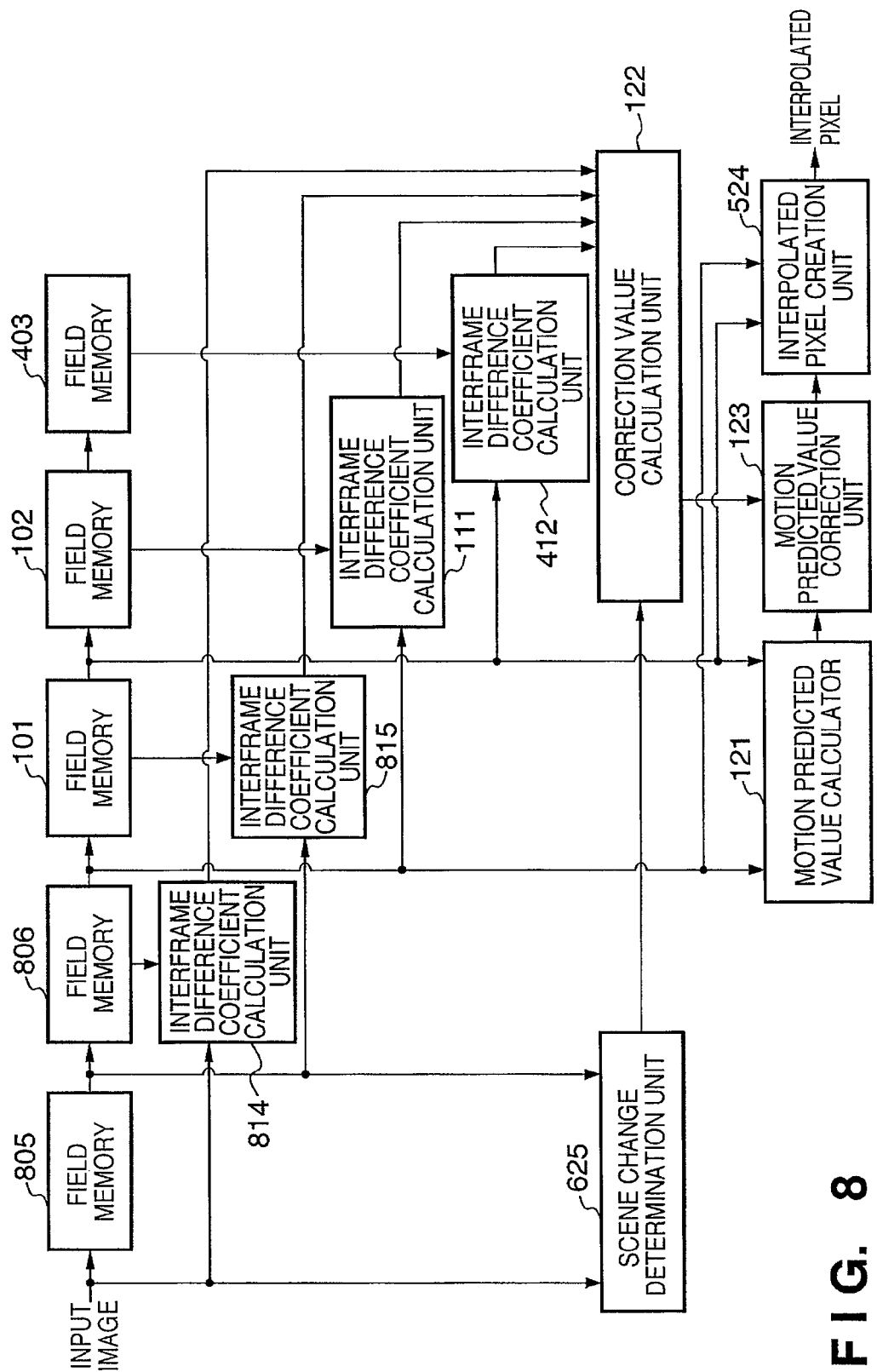
FIG. 8 is a block diagram showing the arrangement of an IP conversion processing apparatus.

FIG. 8 is a block diagram showing the arrangement of an IP conversion processing apparatus according to this embodiment. The same reference numerals in FIG. 8 denote components which have the same functions as those in FIG. 1 of the first embodiment, FIG. 4 of the second embodiment, FIG. 5 of the third embodiment, and FIG. 6 of the fourth embodiment, and a repetitive description thereof will be avoided. Referring to FIG. 8, reference numerals 805 and 806 denote field memories, each of which sequentially stores image data for one field of an input image.

Reference numerals 814 and 815 denote interframe difference coefficient calculation units. The interframe difference coefficient calculation unit 814 calculates interframe difference coefficients based on the input image and a field image stored in the field memory 806. The interframe difference coefficient calculation unit 815 calculates interframe difference coefficients based on field images stored in the field memories 805 and 101. The scene change determination unit 625 makes scene change determination based on the input image and a field image stored in the field memory 805, and outputs the determination result to the correction value calculation unit 122.

The IP conversion processing operation in the IP conversion processing apparatus with the above arrangement will be described below. Prior to the processing, the contents of the field memories 805, 806, 101, 102, and 403 are reset to all zeros.

When image data for one field is input, that image data is input to and stored in the field memory 805. When the next field image data is input, the field image stored in the field memory 805 is stored in the field memory 806, and a new field image is stored in the field memory 805.

When the next field image data is input, the following processing is sequentially executed:
the field image stored in the field memory 806 is stored in the field memory 101;
the field image stored in the field memory 805 is stored in the field memory 806; and
a new field image is stored in the field memory 805.

When the next field image data is input, the following processing is sequentially executed:
the field image stored in the field memory 101 is stored in the field memory 102;
the field image stored in the field memory 806 is stored in the field memory 101;
the field image stored in the field memory 805 is stored in the field memory 806; and
a new field image is stored in the field memory 805.

When the next field image data is input, the following processing is sequentially executed:
the field image stored in the field memory 102 is stored in the field memory 403;
the field image stored in the field memory 101 is stored in the field memory 102;
the field image stored in the field memory 806 is stored in the field memory 101;
the field image stored in the field memory 805 is stored in the field memory 806; and
a new field image is stored in the field memory 805.

Furthermore, the following processing is executed:
a new field image and the field image delayed by the field memory 806 are input to the interframe difference coefficient calculation unit 814;
the field images delayed by the field memories 805 and 101 are input to the interframe difference coefficient calculation unit 815;
the field images delayed by the field memories 806 and 102 are input to the interframe difference coefficient calculation unit 111; and
the field images delayed by the field memories 101 and 403 are input to the interframe difference coefficient calculation unit 412.

Also, a new field image and the field image delayed by the field memory 805 are input to the scene change determination unit 625.

The scene change determination processing by the scene change determination unit 625 will be described below. Upon reception of a new field image and the field image delayed by the field memory 805, the scene change determination unit 625 sequentially calculates difference values between all spatially corresponding pixels included in the input field pair. The unit 625 checks if each difference value assumes a significant value with respect to a threshold th2, i.e., the difference value is equal to or larger than the threshold th2.

$$C_{m,n} = |A_{m,n} - B_{m,n}|$$

$$\text{IF } (C_{m,n} \geq th2) D = D+1 \tag{15}$$

The scene change determination unit 625 checks if the number D of difference values that assume significant values assumes a significant value with respect to a total determination result threshold th3. If the number D assumes a significant value, the unit 625 outputs TRUE as a determination result; otherwise, it outputs FALSE as a determination result.

Figure 9:
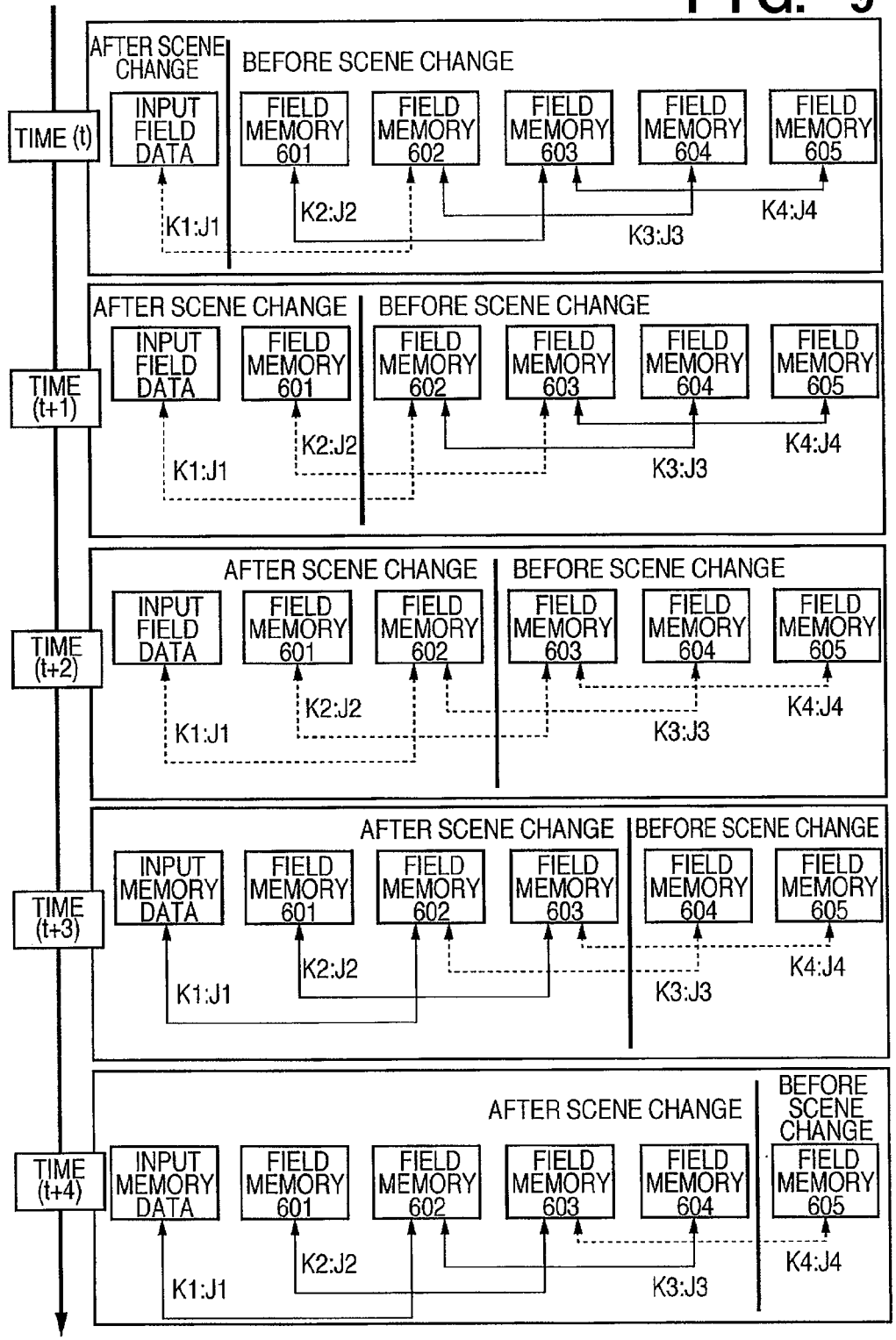
FIG. 9 is a view showing a temporal change in a pattern used to discard interframe difference coefficients using scene change determination.

FIG. 9 is a view showing a temporal change in pattern that discards interframe difference coefficients using scene change determination when the correction value calculation unit 122 calculates a correction value. Let K1:J1 be the interframe difference coefficients output from the interframe difference coefficient calculation unit 814, and K2:J2 be the interframe difference coefficients output from the interframe difference coefficient calculation unit 815. Also, let K3:J3 be the interframe difference coefficients output from the interframe difference coefficient calculation unit 111, and K4:J4 be the interframe difference coefficients output from the interframe difference coefficient calculation unit 412.

At time (t), the scene change determination unit outputs a scene change determination result to the correction value calculation unit 122. The correction value calculation unit 122 calculates a correction value L1 by:

$$L1=(K2+K3+K4)/(J2+J3+J4) \quad (16)$$

At time (t+1), the correction value calculation unit 122 calculates a correction value L2 by:

$$L2=(K3+K4)/(J3+J4) \quad (17)$$

At time (t+2), the correction value calculation unit 122 calculates a correction value L3 by:

$$L3=1 \quad (18)$$

At time (t+3), the correction value calculation unit 122 calculates a correction value L4 by:

$$L4=(K1+K2)/(J1+J2) \quad (19)$$

At time (t+4), the correction value calculation unit 122 calculates a correction value L5 by:

$$L5=(K1+K2+K3)/(J1+J2+J3) \quad (20)$$

The aforementioned calculation processes indicate that a field having a scene different from a field used to calculate the motion predicted value is not included in a calculation of the correction value. It is understood that the aforementioned processes are proper even in consideration of FIG. 7 described in the fourth embodiment. However, FIG. 7 is a flowchart showing the calculation processing of a correction value using the determination result obtained from the scene change determination unit 625 and the interframe difference coefficients obtained from the interframe difference coefficient calculation units 814, 815, 111, and 412.

As described above, this embodiment determines a scene change, and corrects the mixing ratio using suited interframe difference data. For this reason, the precision of the IP conversion processing can be further improved.

More specifically, the predicted value calculation apparatus according to this embodiment executes the following processing when there is a field inapplicable as image information used to correct the motion predicted value calculated by the motion predicted value calculator 121 due to occurrence of a scene change. That is, the scene change determination unit 625 specifies a field pair where a scene change has occurred, and the correction value calculation unit calculates a correction value without using the interframe difference coefficients calculated based on a field inapplicable to correction using the scene change determination result. For this reason, a motion predicted value with higher precision can be calculated.

Note that this embodiment has been described under the condition that image information held in each field memory includes luminance signals on a YCC color space. Alternatively, color difference signals may be used or respective pieces of color information on an RGB color space may be used.

As described above, according to the present invention, an IP conversion processing technique with improved precision can be provided.

While the present invention has been described with reference to exemplary embodiments, it is to be understood that the invention is not limited to the disclosed exemplary embodiments. For example, a computer-readable storage medium on which a program code that implements the functions of any of the exemplary embodiments described above is recorded can be provided to a system or apparatus to cause the system or apparatus to read and execute the program code stored on the recording medium. In such cases, the program code itself read from the computer-readable storage medium implements the functions of any of the exemplary embodiments described above and the program code itself and the computer-readable storage medium on which the program code is recorded constitutes the present invention. The scope of the following claims is to be accorded the broadest interpretation so as to encompass all such modifications and equivalent structures and functions.

This application claims the benefit of Japanese Patent Application No. 2007-014198, filed Jan. 24, 2007, which is hereby incorporated by reference herein in its entirety.

What is claimed is:

1. An image processing apparatus for calculating a change predicted value of a pixel value of a pixel of interest included in a field of interest upon generating a progressive video signal from an interlaced video signal, said apparatus comprising:

a plurality of field memories that stores each one of sequentially input fields;

a change predicted value calculator that calculates a first change predicted value indicating a degree of change in the pixel value of the pixel of interest, based on the field of interest and a field which has a field interval by 1 from the field of interest and is stored in any one of said plurality of field memories;

one or more coefficient calculation units each of which calculates interframe difference coefficients based on any of two fields having a field interval of 2 of a plurality of fields stored in said plurality of field memories, and a field which is being input;

a correction value calculation unit that calculates a correction value of the first change predicted value based on the interframe difference coefficients calculated by said coefficient calculation units; and a correction unit that corrects the first change predicted value calculated by said change predicted value calculator, based on the correction value calculated by said correction value calculation unit, and that outputs the corrected first change predicted value as a second change predicted value.

2. The apparatus according to claim 1, wherein each of said field memories stores one of the field of interest, a field ahead of the field of interest, and a field following the field of interest.

3. The apparatus according to claim 1, wherein said change predicted value calculator calculates the first change predicted value based on pixel values of pixels included in two lines which are included in the field of interest and neighbor the pixel of interest, and pixel values at a position of the pixel of interest which is included in the field that is stored in any one said field memories and has a field interval by 1 from the field of interest.

4. The apparatus according to claim 1, wherein each of said coefficient calculation units calculates the interframe difference coefficients based on differences between pixel values of pixels which are included in a predetermined region having the pixel of interest as the center and are located at identical positions between the two fields having the field interval of 2.

5. The apparatus according to claim 1, further comprising:
a determination unit adapted to determine a scene change, wherein said correction value calculation unit calculates the correction value based on a scene change determination result of said determination unit.

6. The apparatus according to claim 1, further comprising:
a creation unit adapted to create interpolated pixel values to be interpolated between lines included in the field of interest based on the field of interest, fields which neighbor the field of interest, and the corrected change predicted value calculated by said image processing apparatus.

7. A control method of controlling an image processing apparatus which calculates a change predicted value of a pixel value of a pixel of interest included in a field of interest upon generating a progressive video signal from an interlaced video signal, and comprises a plurality of field memories adapted to store each one of sequentially input fields, said method comprising:

a change predicted value calculation step of calculating a first change predicted value indicating a degree of change in the pixel value of the pixel of interest, based on the field of interest and a field which has a field interval by 1 from the field of interest and is stored in any one of the plurality of field memories;

one or more interframe difference coefficient calculation steps of each respectively calculating interframe difference coefficients based on any of two fields having a field interval of 2 of a plurality of fields stored in the plurality of field memories, and a field which is being input;

a correction value calculation step of calculating a correction value of the first change predicted value based on the interframe difference coefficients calculated in the coefficient calculation steps; and a correction step of correcting the first change predicted value calculated in the change predicted value calculation step, based on the correction value calculated in the correction value calculation step, and outputting the corrected first change predicted value as a second prediction value.

8. A non-transitory computer-readable storage medium storing a program for making a computer execute a control method of an image processing apparatus according to claim 7.

* * * * *